(12) United States Patent
Ruján et al.

(10) Patent No.: US 7,509,578 B2
(45) Date of Patent: Mar. 24, 2009

(54) CLASSIFICATION METHOD AND APPARATUS

(75) Inventors: Pál Ruján, Neustadt/Wied (DE); Harry Urbschat, Neustadt/Wied (DE)

(73) Assignee: BDGB Enterprise Software S.A.R.L., Neuchatel (CH)

( * ) Notice: Subject to any disclaimer, the term of this patent is extended or adjusted under 35 U.S.C. 154(b) by 47 days.

(21) Appl. No.: 11/240,525

(22) Filed: Oct. 3, 2005

(65) Prior Publication Data

US 2006/0212413 A1 Sep. 21, 2006

Related U.S. Application Data

(63) Continuation of application No. 09/561,196, filed on Apr. 27, 2000, now Pat. No. 6,976,207.

(30) Foreign Application Priority Data

Apr. 28, 1999 (EP) .................................. 99108354

(51) Int. Cl.
*G06N 3/00* (2006.01)
(52) U.S. Cl. .................................... 715/273
(58) Field of Classification Search ................ 715/513, 715/517, 523, 530, 234, 243, 254, 255, 273
See application file for complete search history.

(56) References Cited

U.S. PATENT DOCUMENTS

| | | | | |
|---|---|---|---|---|
| 5,201,047 A | * | 4/1993 | Maki et al. | 707/4 |
| 5,537,491 A | * | 7/1996 | Mahoney et al. | 382/218 |
| 5,649,068 A | * | 7/1997 | Boser et al. | 706/12 |
| 5,675,710 A | * | 10/1997 | Lewis | 706/12 |
| 6,161,130 A | * | 12/2000 | Horvitz et al. | 709/206 |
| 6,192,360 B1 | * | 2/2001 | Dumais et al. | 707/6 |
| 2001/0042083 A1 | | 11/2001 | Saito et al. | |

FOREIGN PATENT DOCUMENTS

| | | |
|---|---|---|
| EP | 1049030 | 11/2000 |
| JP | 11-184894 | 7/1999 |

OTHER PUBLICATIONS

English Translation of Japanese Office Action issued in Application No. 2003-522903 mailed Jul. 29, 2008.
Machine Translation of JP 11-184894.

* cited by examiner

*Primary Examiner*—Stephen Hong
*Assistant Examiner*—Kyle R Stork
(74) *Attorney, Agent, or Firm*—DLA Piper LLP US

(57) ABSTRACT

A method for building a classification model for classifying unclassified documents based on the classification of a plurality of documents which respectively have been classified as belonging to one of a plurality of classes, said documents being digitally represented in a computer, said documents respectively comprising a plurality of terms which respectively comprise one or more symbols of a finite set of symbols, and said method comprising the following steps: representing each of said plurality of documents by a vector of n dimensions, said n dimensions forming a vector space, whereas the value of each dimension of said vector corresponds to the frequency of occurrence of a certain term in the document corresponding to said vector, so that said n dimensions span up a vector space; representing the classification of said already classified documents into classes by separating said vector space into a plurality of subspaces by one or more hyperplanes, such that each subspace comprises one or more documents as represented by their corresponding vectors in said vector space, so that said each subspace corresponds to a class.

20 Claims, 5 Drawing Sheets

- □ Documents in class I
- ⬡ Documents in class II
- ○ Documents in class III
- × Documents in class IV
- ▽ Documents in class V

CLASSIFICATION METHOD AND APPARATUS

This application is a continuation of Ser. No. 09/561,196 filed Apr. 27, 2000 now U.S. Pat. No. 6,976,207, which is the national stage filing under 35 U.S.C. § 371 of international application No. PCT/EP00/03097 filed Apr. 6, 2000 incorporated in their entireties by reference.

The present invention relates to a method and an apparatus for the classification of documents.

BACKGROUND OF THE INVENTION

The amount of documents expressed in natural languages is increasing at an exponential rate, due to new communication media (Internet) and the automatization process of administrative work. At the same time, the electronical archiving of older, printed documents, requires a major effort in manpower Libraries are traditional examples of a consequent effort in introducing generally valid classification schemes allowing for a fast and effective retrieval of relevant documents. The present changes in the role and ways libraries operate illustrates best the problems related to extracting relevant information from an ever growing flux of unclassified documents. Searching for relevant information is therefore more and more similar to breaking a cryptographic code. Hence, an effective information storage and retrieval system must be based on a good model for the kind of information the user is interested in, a corresponding model for defining document classifications, and an appropriate classification system.

In the following some known approaches to deal with the above problems are described.

Any informational system has first to address the problem of what and how relevant information is described in mathematical terms to enable their processing by a computer. This is also known as the data representation problem.

The traditional approach to understand natural languages has been the rule-based linguistic approach. This requires a Thesaurus-type data base, which describes not only the word roots but also the relations to other words of similar meaning. An example is the hand-built Thesaurus such as The Webster, or more sophisticated on-line lexicographic databases, as the WordNet, described in Voorhes et al, Vector Expansion in a Large Collection, Proceedings of TREC, 1992 (Siemens Corporate Research, Princeton, N.J.). Based on such Thesauri a classification and further processing of documents, e.g. a translation into other languages, can be executed. The creation of domain specific thesauri is a major investment costing many man-year labor, as clearly exemplified by automatic machine translational systems. It is therefore desirable to avoid the necessity of building a Thesaurus for processing the informational content of documents.

Another approach which is used for document retrieval is disclosed in U.S. Pat. No. 5,675,710. A document vector space is defined around a predefined set of indexing terms used in a standard SQL database. The coordinate axes correspond to the indexing terms (like, Authors, Title, year of publication, etc), much in the same way a library catalogue is organized. The numerical values of the components describing one single document refer to the level of relevance in a two-class classification procedure, namely whether the document is relevant to a certain query or not. This relevance feedback approach is limited in its capabilities since it is strongly linked to the configuration of the SQL database and does therefore not provide an efficient and flexible method for document representation for classification purposes.

SUMMARY OF THE INVENTION

It is therefore an object of the present invention to provide a highly efficient and flexible method and an apparatus for building a classification scheme which can be used to classify documents in an efficient and flexible manner.

To solve the above object according to the present invention there is provided a classification scheme or model in which documents are represented as vectors for classification purposes. A document is formed of or may comprise a sequence of terms. The vector components of a vector representing a certain document corresponds to the frequency of occurrence of terms in said document. With such a representation the classification of a document may be reflected by the location of the vector representing said document in the vector space which is spanned up by said vector. The vector space is separated into subspaces by one or more hyperplanes, and such a subspace of the vector space corresponds to a certain class.

If such a representation is applied to a set of documents which have already been classified (for example by a user, or by any other automatic classification), then the representation of the documents by their corresponding vectors together with the separation of the corresponding vector space into subspaces forms a classification scheme (or a classification model) which reflects the classification of the already classified documents and which may be used for (automatic) classification of unknown and unclassified documents. The hyperplanes thereby are such that they divide the vector space into subspaces which respectively correspond to the classes into which the documents are classified.

With such a scheme it becomes possible to very effieciently exploit the content of the documents for classification purposes, since it is possible to use virtually all of the terms (all words, any sequence of words) to build the vector space. Moreover, the classification categories themselves may be completely arbitrary as long as they reflect the internal structure of the corpus. This means that documents within a class should have stronger correlations than documents belonging to different classes. It is up to the user to choose how he wishes to categorize the documents and then to build a classification scheme which reflects this categorization. This is because the classification scheme is not based on any linguistic or semantic approach, it does not have to take into account any syntactic, semantic or linguistic analysis, rather it is just based on—to speak simply—how often are certain elements or terms occurring in a document. This makes it possible to very flexibly classify the documents into categories, any categorization of documents will be reflected in the vector space and its subspaces and therefore the scheme of the invention is very powerful in terms of flexibility with respect to the classification categories it can represent.

The vector space can be very large (virtually all terms (or words) of a document can be used in the classification scheme), it is therefore possible to very effectively represent a classification of documents. Since a lot of information, if desirable virtually all of the information contained in a certain document is exploited, but without having to semantically or linguistically analyze this information, a very efficient and capable classification scheme can be provided.

Preferable the vectors are in a sparse representation to reduce the calculation effort.

Preferably, the vector representation generated during building the classification scheme is obtained as follows. First, a dictionary of terms corresponding to the coordinate axes of the generated vector space is created. This can be done by going through a training corpus of documents which already have been classified, such that the terms which should finally form the dimensions of the vector space are extracted. One can apply certain predefined criteria (e.g. to search for individual words, to search for words which have a length greater than a certain threshold, or the like), and the elements of the documents of the training corpus which meet these criteria then are considered to form the terms which correspond to the dimensions of the vector space to be generated. The more terms are used to create the vector space, the better the representation of the contents of the documents of the training corpus is.

Another preferable solution is to use a predefined dictionary (or a corresponding predefined vector space) and then to just calculate the values of the components of the vectors which represent the individual documents.

Still another preferable solution is to start with a predefined vector space, to calculate the vector representation of the documents based on this predefined vector space, and then to refine this vector representation by enlarging the dimension of the vector space by incorporating new terms which have not been incorporated into the predefined vector space but which are contained in the documents of the training corpus.

A preferable way of generating the subspaces corresponding to the individual classes is generating a Voronoi-tessellation of the vector space. Thereby the subspaces calculated based on the already classified documents are such that they are particularly suitable for automatically classifying unknown documents, since the likelihood of an error occurring in such an automatic classification (the so called generalization error) becomes small in such a case.

A preferable realization of a classification apparatus employing a classification scheme according to the invention is based on a Perceptron, which can be realized by a computer program.

Further it is preferable that the hyperplanes separating the vector space into subspaces are surrounded by margins which are such that none of the vectors of the documents on which the classification scheme is based falls within said margins.

An automatic classification of an unknown document may be performed based on calculating the location of the vector representing said document, in particular, may be based on the judgement into which of the subspaces and thereby into which of the corresponding classes the vector falls.

Preferably the so classified document (or vector) is assigned a label representative of the corresponding class.

A confidence level of a classification is preferably based on the distance between the vector representing said document and the hyperplanes separating said vector space, it may further be based on the maximum margin surrounding said hyperplanes. This makes it easier to check the (automatic) classification by only checking it if the confidence level is below a certain value.

The classification scheme may also be refined by incorporating additional documents into a given classification scheme(s). This may be either achieved by recalculating the positions of the hyperplanes, such that the additional document also falls into the correct class, or it may be done by building a completely new vector space which now also includes vector components (terms) which have not been taken into account so far.

It is preferable if the renewed calculation of the classification scheme includes one or more documents which have either been wrongly classified during automatic classification or documents which have a low confidence level. This makes the refinement of the classification extremely effective, since the scheme can learn most from its biggest errors, and therefore the learning efficiency is highest if the examples where the scheme performed worst are used for improving the scheme to thereby decrease the likelihood of future errors.

It is therefore preferable to have the system to do the following:
  listing the automatically classified documents according to their confidence value;
  refining the classification scheme by selecting the document(s) with the lowest confidence level or the document(s) whose confidence level is below a certain treshold for repeatedly calculating the classification scheme, based on a correct classification of said document, which may for example be input by the user.

Preferably there is provided a plurality of sets of classification classes by generating a plurality of separations of said vector space into a corresponding set of subspaces such that each set of subspaces forms a classification model which corresponds to the classification of said documents.

Preferably the classification scheme is used for indexing a database such that an index corresponds to a classification class or an intersection of classes in a plurality of classification schemes. This makes it possible to provide multiple views of the documents in the sense that a view corresponds to a classification scheme which categorizes the members of a set of documents into a set of classes, and another view categorizing the members of the set of documents into another set of classes. Thereby multiple categorizations can be applied to the documents and these multiple categorizations can be used for representing respective classifications of said documents. This makes it possible to more precisely categorize each individual document, and multiple views may be applied to more efficiently retrieve documents by requiring that the searched documents belong to a plurality of classes of respectively different classification schemes.

Preferably a method according to the invention also comprises one or more of the following:
  filtering the output of a computer system, in particular the output of a query on a database, a file directory system or an internet search engine, such that only the output elements which are in accordance with one or more selected classes form the filtered output;
  automatically assigning or routing a document to a directory or a routing path, by assigning or routing said document to the directory or the routing path which corresponds to one or a plurality of classes used to classify directories or routing paths;
  ordering documents according to their relevance by using said classification scheme for classifying documents into classes which correspond to the relevance of the documents contained in a certain class;
  analyzing, categorizing or archiving one or more unclassified documents, particularly a large set of unclassified documents such as the contents of a library, by ordering them according to said classification scheme;
  checking the manually performed classification of one or more documents to identify inconsistencies or errors in said manual classification by comparing the result of an automatic classification with a manually performed classification.

According to a preferred embodiment there is provided a classification scheme the representation of which is stored for example in a database by storing the vector space and the subspaces representing it, and which may be used to classify new documents. Since new documents can be added to a classification scheme(s) without errors, such a storage scheme may be highly improved by many subsequent iterations of the learn process and it may then finally represent a very specific and highly adapted tool to be used for classification in a certain environment for which it has been adapted (or "trained"), such as a library, an archive, an administration office, the directory (or file) structure of a certain—possibly very large—computer system, or any other environment in which documents are to be classified into a classification scheme which has to be very much adapted for the specific environment.

Preferably the classification method, the classification scheme, and the apparatus for classifying unknown documents are implemented by a general purpose computer having theron a program running which causes said computer to execute a method which is in accordance with the present invention. An apparatus according to the present invention may also be realized by a special purpose computer, which is designed to implement for example a neural network which is configured such that it executes a method which is in accordance with the present invention. Another possible implementation of the present invention consists in a data carrier having recorded thereon a computer program which when loaded into the memory of a computer causes the computer to execute a method in accordance with the present invention. The invention may also consist in a computer program which when loaded into a computer causes said computer to execute a method in accordance with the present invention.

Another preferable embodiment may implement the present invention by a multi-processor machine, or by a distributed computing system consisting of a client-server architecture which is configured such that it can perform a method according to the present invention.

DETAILED DESCRIPTION

In the following the invention will be described in detail by means of preferred embodiments with reference to the accompanying drawings, in which.

Figure 1:
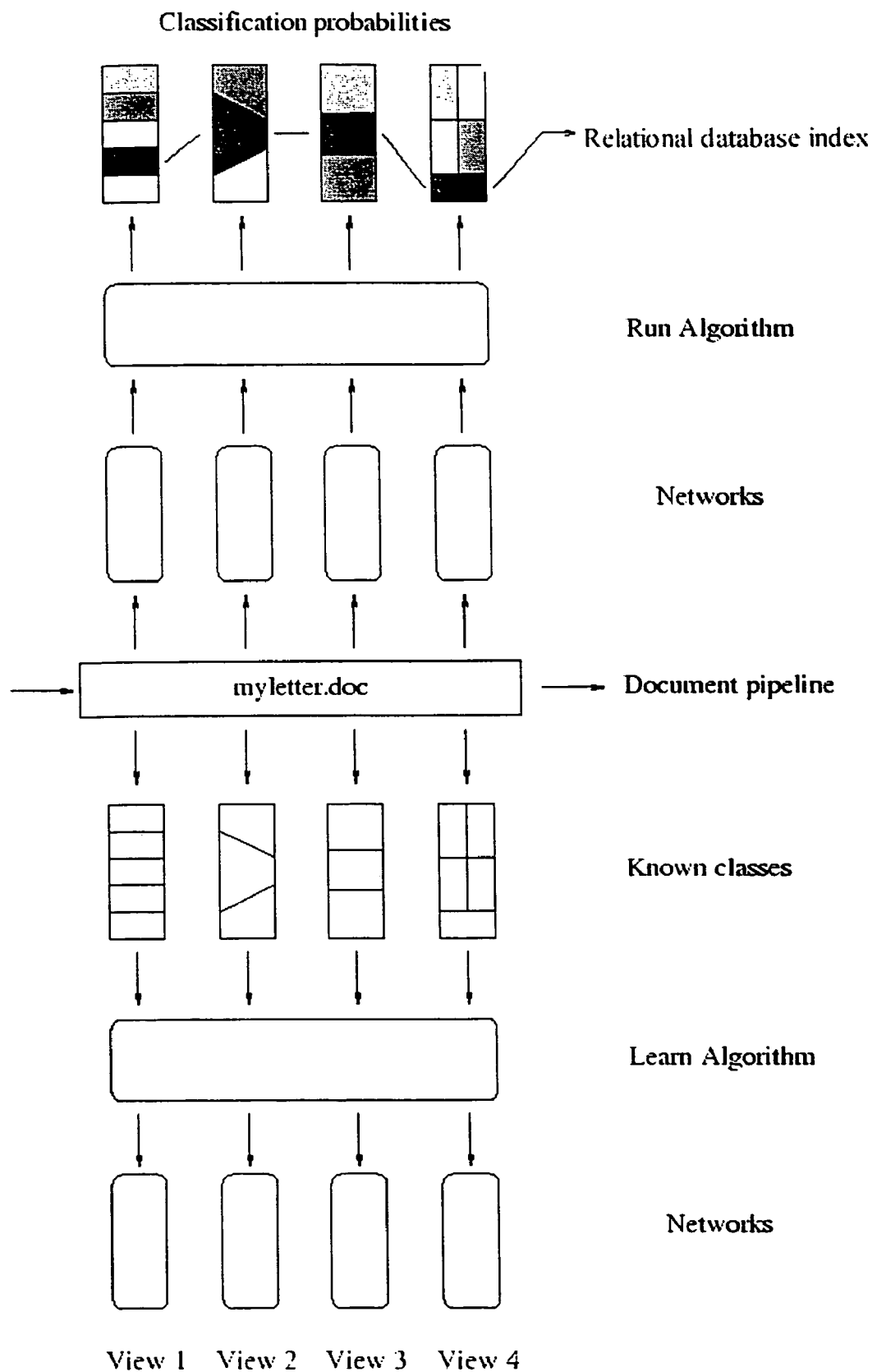
FIG. 1 shows a schematic illustration of the overall structure of an embodiment according to the present invention.

In order to make the description of the underlying mathematical models more understandable we introduce first a few notations and definitions:

Each document is written in some language using a sequentially organized finite sets of symbols, typically the ASCII-set. Examples are WinWord documents, OCR-processed documents, HTML web-pages, C++ and Java programs, the page or chapter of a book, etc. The size of these documents can vary between a few hundred words to several thousand ones, depending on the application. However, very short documents have less discriminatory power while very long ones tend to reduce the statistical accuracy of the classifier and to increase the running time of the algorithm.

In a given view v each document might pertain only to one of the $K(v)$ classes or categories, including the "'unknown'" class. While in a given view the classes are disjoint, different views might overlap.

In general, a single document might belong to many views. For example, a page of "'Faust'" might belong to the class "'Faust'" among the works of Goethe, it might belong to "'Goethe'" in a view considering the most famous German Authors, it might belong to the class "'German'" in a view classifying documents according to their native language, or to the class "'poem'" in a view classifying according to the literary style. In the same way, users of a certain common databank might create their own classification schemes (views) and use those instead of a canonized indexing scheme.

Each document is mathematically described as an D-dimensional vector $\vec{d}$ as $\vec{d}=(d_1, d_2, \ldots, d_D)$. The dimension D of the corresponding vector space depends on the view, the documents, and the preprocessing model. In the implementation presented below this vector space is automatically generated.

The scalar product between two vectors a and b is defined as $$\langle \vec{a}, \vec{b} \rangle = \sum_{i=1}^{D} w_i a_i b_i, \quad (1)$$

$$w_i > 0$$

where $w_i$ (i=1, ..., D) are some weights. The weight of each coordinate can be either hard-coded by the user or can reflect some a priori probability distribution obtained directly from the data.

The Euclidean distance between the two vectors $\vec{a}$ and $\vec{b}$ is defined as usual as $$d_E(\vec{a}, \vec{b}) = \sqrt{(\vec{a}, \vec{a}) + (\vec{b}, \vec{b}) - 2(\vec{a}, \vec{b})} \quad (2)$$

For a given view the training-set is a set of documents in the form $\{\vec{\xi}^{(\alpha)}\}^{\alpha=N}_{\alpha=1}$, where each document consists of the input-output pair $\vec{\xi} = (\vec{d}, \text{class})$, the word-vector and its class.

A learning-algorithm is a procedure which enforces an algorithmic structure (classifier) whose input is the word-vector and output(s) the desired class code(s).

The data representation deals with the optimal mathematical coding of the input documents and output classes.

The training error is the error made by the classifier on training (known) examples, the generalization-error is the error made on a typical, for the classifier unknown document. In most applications one wants to minimize the average generalization error. In cases where a high risk is associated with some type of errors one might want to minimize the maximal amount of such errors. Yet other applications might require a minimal training-error. The standard method for dealing with such problems is to define appropriate cost (risk) functions and to estimate the generalization error with the leave-one-out (loo) estimate. In this approach one leaves out from the training set one document and after learning one tests the classifier on it. This procedure is repeated for all M documents, the average result gives an unbiased estimate of how well the classifier will perform on unknown data.

Given a set of points (vectors) in D dimensions the Voronoi-cell of point i is the set of points whose Euclidean distance to i is smaller than the distances to any other point $j \neq i$. Covering the space with Voronoi cells leads to the Voronoi-tessellation of the vector space. The Voronoi construction is the method of choice for building optimal vector-quantizers (class-representatives), reducing the amount of data to fewer but representative points such that in average the amount of information loss is minimal (see A. Gersho and R. M. Gray, Vector Quantization and Signal Compression, Kluwer Academie Publishers, Boston/Dordrecht/London, 1991).

A set of points belonging to two different classes is linearly separable if there exist a hyperplane in D-dimensions such that all points of the first class are above and all points of the second class are below the separating hyperplane. In this case the convex hull of the first and of the second class do not intersect.

The minimal connector is the shortest distance between a point lying on the convex hull of the first class and a second one lying on the convex hull of the second class. If the set is linearly separable, the minimal connector is strictly positive.

A document may be considered as a sequence of terms. A term can be a single word, a pair of consecutive words, etc. If the document is not already in the form a computer can process, then it may be brought into such a form, e.g. by an OCR processing. A dictionary of the terms is created for the whole training corpus, which consists of several documents which are to be "learned" by the system with respect to their classification, and—simultaneously—the occurrence frequency of these terms is also computed. Preferably very often and/or very rare terms are omitted from the dictionary for efficiency purposes.

The size of the so-generated dictionary might be very large without decreasing the system's performance. Each document is preferably coded as a sparse vector, whose length is limited by the number of terms in the document. To create a dictionary the preprocessor filters out the predefined terms, like ASCII formatted words, etc. It stores it in a tree or hashing list together with the occurrence frequency. The leaves not satisfying the frequency of occurrence conditions are deleted. In the second pass each document is mapped into a vector containing the document's labels, and the pairs of (term, frequency) it contains.

As a result, one obtains a set of vectors, each vector corresponding to one of the documents of the training corpus. The dimension of the vectors respectively representing one of the documents corresponds to the entries in the dictionary which has been created from the training corpus. Therefore, all vectors have the same dimension, however, the values of the components of each vector are representative of the content of the document which this vector represents.

The vector representation of the individual documents is to some extent a matter of choice which is up to the user and which can be chosen depending on the desired accuracy of the representation of the content of the documents versus the computational costs. It is clear that the vector representation is a more accurate representation of the document contents if the dimension of the vector space is higher. However, it may be possible without losing too much accuracy to cut off some of the dimensions of the vector representation. For example, in an English text very short words consisting of only a single or two characters, may contain not very much information useful for classification purposes, since it does not tell you very much whether the word "in" has been used 235 times or 325 in a certain text, since almost every English text contains the term "in" several times. However, such a choice to leave out certain terms which could in principle be used since they are contained in the documents can for one classification scheme have a very large effect, for another scheme it may have a very small effect. Consider, for example, the two classification classes "textbooks relating to the use of local prepositions in the English language" and as another class "other documents". It is very evident that for such a classification scheme the frequency of occurrence of the term "in" may very well effect the accuracy of the classification scheme, since it is clear that in textbooks relating to the use of prepositions in the English language, the term "in" should occur much more often than in other documents.

The above example also shows how very flexible and adaptable the described document representation scheme and the classification scheme are. The actual final choice how the dictionary is created and which terms should be included in the vector representation therefore is a choice which to some extent also depends on the actual classification purpose, and therefore no general recipe can be given, except for the fact that the more dimensions are included in the vector space, the more accurate the representation of the document with respect to their content and with respect to the classification purpose becomes.

Preferably a further preprocessing then is performed which has two tasks. First, it identifies identical vectors whose labels are also identical or contradictory. The identical vectors except one are removed. The contradictory vectors are either removed or their classes are redefined manually or probabilistically using a majority rule. The method of choice is either sorting or hashing.

The second task is to obtain a correct granularity of the class-space. Underpopulated classes are either removed or merged with neighboring classes. Overpopulated classes are split up. A class may be regarded as being overpopulated if the number of documents exceeds 2-4D, where D is the total dimension of the dictionary. These subclasses might or might be not accessible to the user. The method of choice for performing the class split is clustering (unsupervised learning) and solves two major tasks. First, it ensures that the generated subclasses will be pairwise linearly separable. Second, by using appropriate methods, substructures within a given class are identified, leading to an improvement of the classification performance. Methods of choice might be a k-d tree generated by principal component analysis, self-organized Kohonen maps, or Bayesian clustering methods like Autoclass.

Based on a classification of the members of a set of documents (the training corpus) which already exists and has for example been made by a user (or is obtained from any other source) a representation of this classification according to a classification scheme is calculated.

The classification scheme is based on splitting up the document vector space into a plurality of cells, which is done by calculating one or more hyperplanes which split up the document vector space. Thereby the vector space is separated into a plurality of cells, and each cell corresponds to one of the classes in the classification scheme. Then the vector representations of the documents which fall into a certain class are such that the vectors of these documents are located within a cell which corresponds to their class. Thereby a geometrical representation of the training corpus is generated, such that the documents of the training corpus are represented by vectors lying in the document vector space, the document vector space being separated into cells, and each cell corresponding to a certain classification class. A new (unclassified) document can then automatically be classified by calculating its location in the document vector space, and by determining the cell (and thereby the class) into which the document vector representing this document falls.

For the document vector space separation into subspaces preferably a Voronoi-tessellation of the document vector space is created which is such that the cells or subspaces of the tessellation correspond to the classes into which the documents are classified. A separation into two individual classes can be performed by the algorithm disclosed in P. Rujan: A fast method for calculating the Perceptron with maximal stability, Journal de Physique (Paris) I 3 (1993) 277.

This algorithm can be used to separate two classes in a hyperspace, and it may be used for calculating the hyperplanes which surround a cell in the Voronoi-tessellation and which form the hull of such a cell or subspace. For that purpose the hyperplanes which respectively separate two individual classes are calculated, and based on the so obtained plurality of hyperplanes a Voronoi-tessellation of the vector space may be obtained.

Preferably there is further calculated a margin surrounding the hyperplanes which form the Voronoi-tessellation, the margin being such that none of the documents of the training corpus falls within that margin. A maximal margin Voronoi-tessellation is thus obtained, which means that the classification of the documents has been learned by the classification scheme and may be used for classifying new unknown documents, as will be described later in detail. The specific algorithm used to calculate the Voronoi-tesselation depends on the choice of the user and on the necessary speed for the specific application.

Unknown documents which are classified using the Voronoi-tessellation can be assigned a confidence level based on their location in the Voronoi-tessellation.

The confidence level can be calculated for example by assigning a confidence level of "1" to the documents which fall within a certain subspace corresponding to a certain class and which do not ly within the margin. For documents which fall within the range of the margin, a confidence level may be assigned such that the confidence level linearly decreases with decreasing distance between the document vector and the hyperplane separating two classes. For example, if a hyperplane separating two classes has a margin of "5" on each side thereof, then a vector representing a document to be classified which has a distance of "3" from the hyperplane may be assigned a confidence level of "0.6".

It is clear that if a subspace is surrounded by a plurality of hyperplanes, then the distance of a document vector to each of the hyperplanes is calculated, and based on the result a confidence level is assigned to said document. For that purpose it is, for example, possible to compute the arithmetic or the geometric mean of the so-normalized distances from the individual hyperplanes so as to define the final confidence level. However, other schemes based on the vector's position could be used as well. It is for example also possible to imagine that not for every document vector which does not "touch" or fall within the margin there is assigned the value "1", but also for example that the confidence value assigned increases with the document vector tending to fall into the center of a certain subspace. Several ways of calculating such a confidence level therefore are possible to imagine and they should just somehow reflect how "confident" one can be that the document vector falls into a certain subspace, and therefore they should somehow reflect the distance between the location of the document vector and the hyperplanes surrounding a cell, possibly also incorporating the location of the document vector with respect to the margins surrounding the hyperplanes as described above.

For a given training set of documents (the training corpus) it is also possible to create or to generate several Voronoi-tessellations of the vector space, whereas each tessellation corresponds to one set of classes into which the documents of the training corpus are classified. Thereby it is possible to have multiple "views" onto the document set, which means that each view corresponds to a categorization of the documents according to a certain classification scheme which is represented by a separation of the document vector space into subspaces corresponding to the classes of a certain view.

Based on such a system it is also possible to retrieve a set of documents which are similar in their contents to a given example. Assume, for example, a secretariat where the secretary has organized the correspondence according to some criteria, like the type of documents (letters, messages, inquiries, sales offers, invoices, etc.), clients, data, etc. A typical case is that one needs to find a certain letter whose content is well remembered but not the exact date, person, etc. Such a document can be retrieved by the present system by two possible retrieval modes. If one enters a query specifying one or more of the classes to which the document belongs, then a list of all documents satisfying these requirements is presented. A second possibility is to present the system a document similar in content to the searched one. This example document can be automatically classified, which means that ist class/view will be automatically generated, together with a confidence level. Based on the so generated classification the system can provide not only a list of relevant documents but also order them in decreasing order of similarity.

If the system is used in conjunction with a standard relational database, then it is possible in certain cases to provide an automatic indexing of non labeled documents.

Consider, for instance, a typical form sheet, like a Visa Application Form. Some of the entries in this form involve a small number of predefined classes, like family status (married, divorced, non-married, widow), or eye color. Such entries can be considered in itself as a view, a classification scheme.

Other entries, like name or pass number can be coded using a multitude of views, like the ASCII code (128 classes) of the first, second, etc. letters/numbers in those names. Hence, a given name or number can be always given as the intersection of a multiview classification. However, since the effectiveness of the classification scheme according to this invention is based on the content similarity between members of the same class, a large generalization error is expected for application of the invention to such form sheets where there is practically no redundancy and practically no inherent similarity between the documents belonging to a certain class.

The system will perform much better in an environment where the indexing scheme/the classification itself is based on content similarity. Note that a book, for example, will be split in documents consisting of one or two pages and therefore all these documents will have the same Author. Furthermore, this list can be further split into German, English, French, etc. Authors and/or writers who lived in the XVII Century, etc. Another index term could be the general subject of the book or the literary form. In such cases a query based on one or more example documents will generate very good results from the intersection of the different views/classifiers. This is because there is an inherent similarity between the documents belonging to a certain class, and this similarity is very effectively reflected in the classification scheme.

A preferred embodiment of the present invention relates to the creation of a new type of a classification scheme, a classification method, or an apparatus for classification, which are used to implement a new type of databank (or an automatic archive system, or an automatic or self-organized file or directory structure in a computer) which is based on learning personally defined views of a document set. After a relatively small number of documents were classified by expert personnel, the databank can make useful suggestions for classifications of an unknown document based on the content of the document. This approach leads ultimately to an automatic classification (indexing) and retrieval of documents which is much more powerful than that of relational databanks. In addition, by removing old documents from the learning process such a system can be made fully adaptive, it may be upated continously and can then reflect the most recent status of the classification environment in which it is used.

This system can be used in a wide class of applications where an unknown document must be automatically classified based on its content only (without indexing). Typical examples are sorting e-mails and bookmarks, organizing hard disks, creating interest-profiles for Internet search or automatic indexing of archives (normal and electronic libraries). This implementation allows each user of a given databank to classify, search, and store data according to their own personal criteria.

The global structure of a system according to an embodiment of the invention is shown schematically in FIG. 1.

The front end of the system is the Views-manager, a versatile tool controlling the interaction between different views and realized by a program running on a computer. The different views are structurally similar but differ in their actual realization. This tool also controls the status of each view (learning or running, pending mode) and dynamically allows the creation (deletion) and splitting (merging) of classes in each view. These operations can be, in general, followed by a retraining of the network-database, which is formed by one or more neural networks. The tool offers also the possibility of removing or adding new (old) views. Typically, a given application comes with some default-views which contain already trained networks. Hence, the inexperienced user can immediately use the data base in run-modus. Through the interaction with the Views-manager and by following its own classification, the classification examples generated by the user are given gradually a larger weight, ensuring a smooth transition to user-specific classification.

FIG. 1 shows a schematic form of the views-manager in learn (lower part) and run modus (upper part). The documents are preprocessed and their coded representation classified accordingly to several classification schemes (views). In learn modus the classification of the document is known in each view. In the run modus the system computes for each view an ordered list of probable classes, together with their confidence. Using multiview classification one can generate one or more indices storable in a standard relational database.

Figure 2:
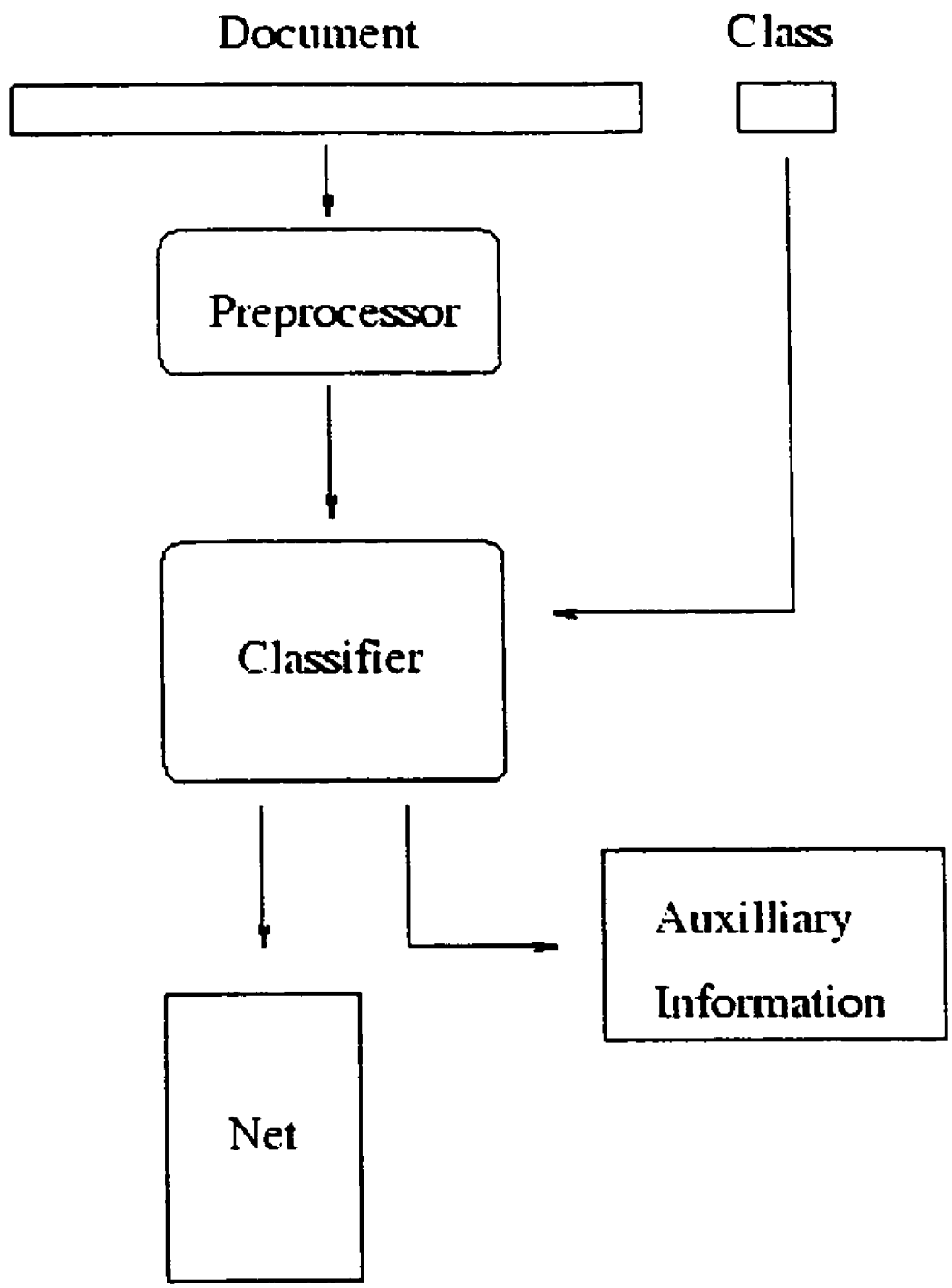
FIG. 2 shows a schematic view of a given class-view module.

Typically, a single view consists of a preprocessor, a learn and a run module. The basic elements are shown in FIG. 2. In the learn modus a set of labeled examples is selected, preprocessed, and stored by the learn-algorithm into a two- or more layer multiperceptron neural network. Additional auxiliary information for data interpretation and on-line visualization is also generated.

The preprocessor enforces both the creation of a symbolic dictionary and the translation of single documents into symbolic vectors which are the classifier inputs. The type of vector space and metric might differ from application to application. The used preprocessing method uses information extracted from the data to be classified and does not require any external dictionary or semantic database.

In the learn-mode the view starts a process which creates first the symbolic feature space, translates the documents into symbolic feature vectors, enforces that all classes are disjoint and finally calls the learn-algorithm. The definition of the symbolic feature space might be different for different views and depends on the document content. These vector space definitions are stored and handled by the Views-manager. For overlapping classes (classes which are not pairwise linearly separable) one can use either a network growth algorithm as disclosed in M. Marchand, M. Golea, and P. Rujan, Europhysics Letters 11 (1990) pp 487-492 or use the kernel methods (support vector machines) as published in the U.S. Pat. Nos. 5,671,333 or 5,649,068. However, if the second preprocessing step has been performed correctly, this situation should not occur.

Figure 3:
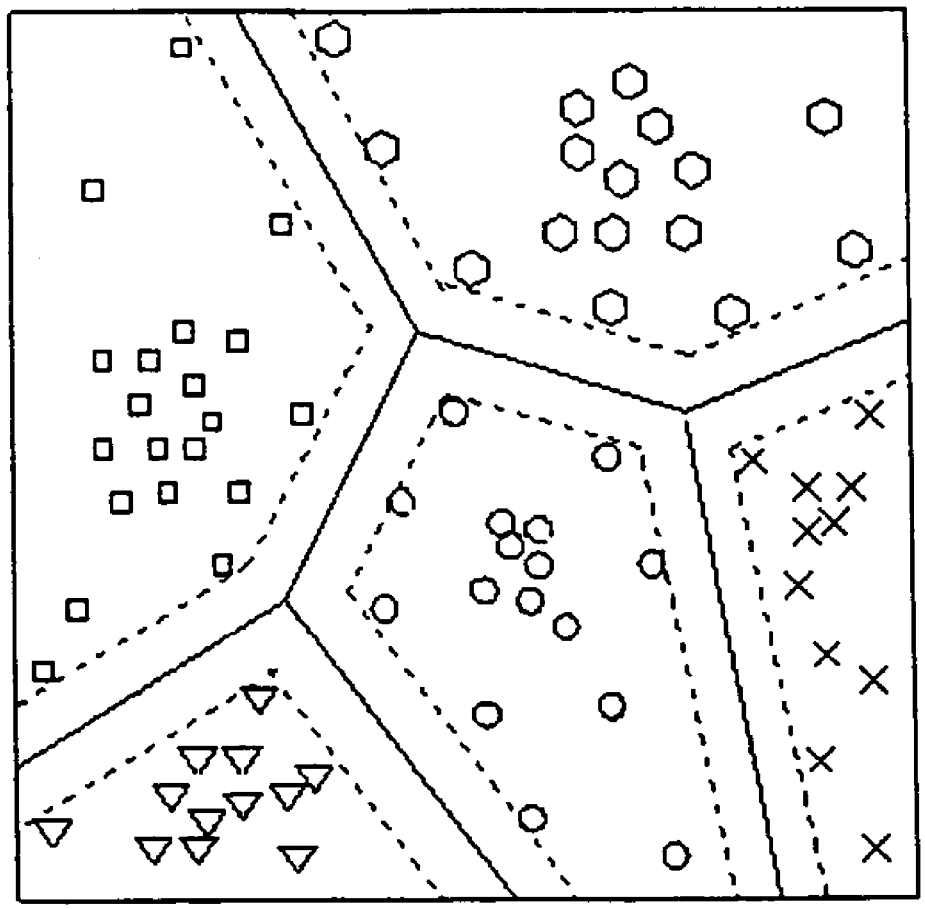
FIG. 3 shows a schematic illustration of a Voronoi-tessellation.
Figure 4:
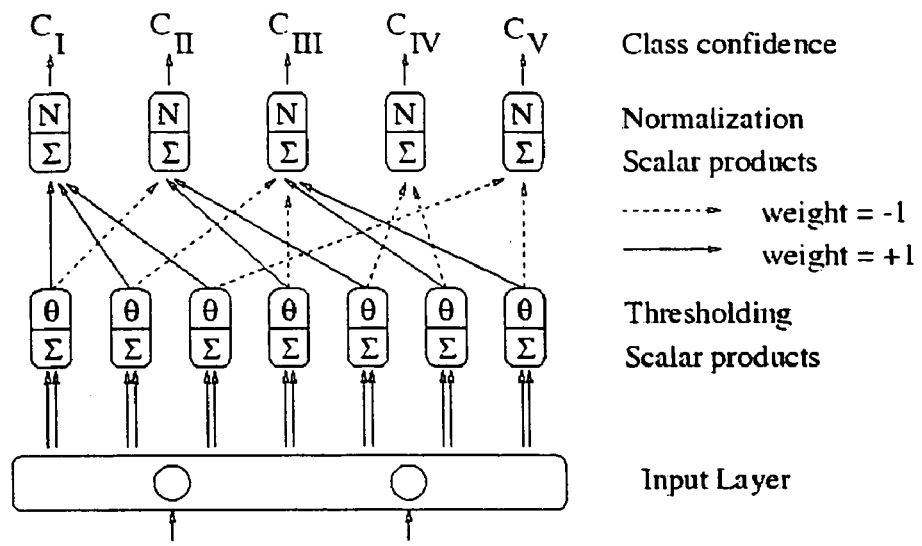
FIG. 4 shows a schematic view of a network corresponding to the Voronoi-tessellation of FIG. 3.

The learn algorithm creates a Voronoi-tessellation in the symbolic feature space, where now each "'cell'" is a class. If one considers each document as a vector (or point) in the symbolic document vector space, then a class of documents is a cloud of such points. The different classes correspond to different clouds and these clouds are separated from each-other by a maximal margin (or maximal stability) Perceptron. A Voronoi-tessellation for different classes is illustrated in FIG. 3, which shows a schematic illustration of a Voronoi-tessellation for 5 classes in a two-dimensional symbolic feature space. The heavy lines define the discriminant surface, the dotted lines the margins of the corresponding Perceptrons. There are in total 7 maximal margin Perceptrons, as illustrated in FIG. 4, which shows a schematic illustration of the network structure corresponding to the Voronoi-tessellation shown on FIG. 4. The $\Sigma$ represent dot-products between the weight and the corresponding input vectors, $\theta$ denotes a step-activation function at threshold $\theta$. N computes the distance from the heavy boundaries normalized by the corresponding margin.

Figure 5:
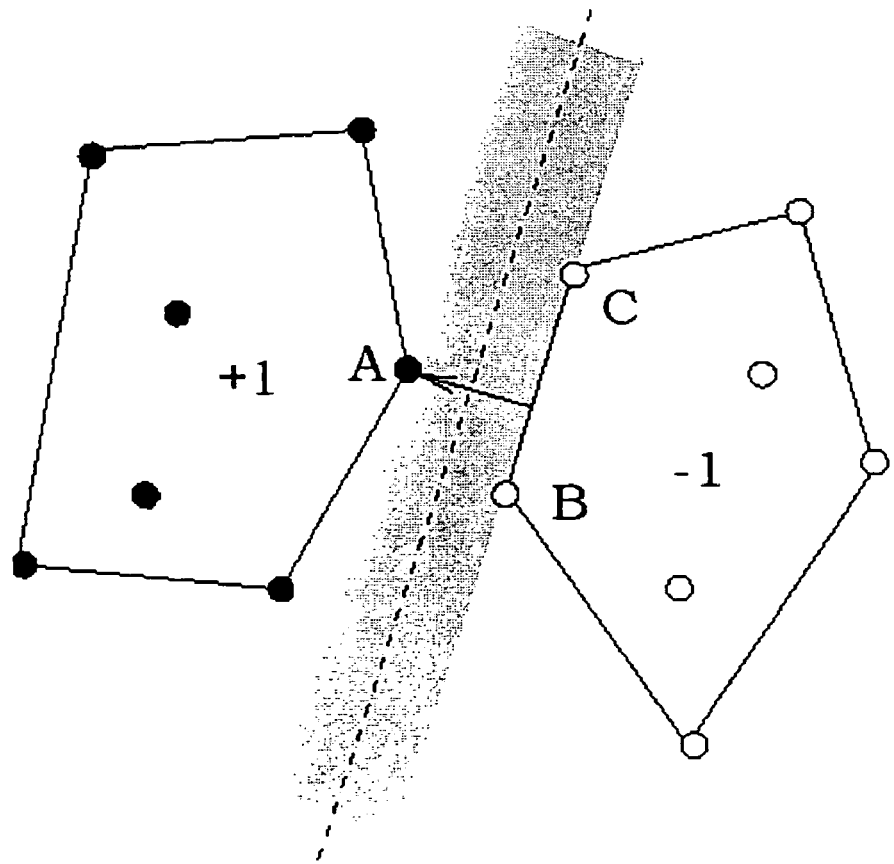
FIG. 5 shows a schematic illustration of a maximum stability perceptron.

Such a structure can be realized in neural network terms by computing the Perceptron with maximal stability (or margin) between all pairs of classes. A fast learning algorithm can be used here which is described in P. Rujan: A fast method for calculating the Perceptron with maximal stability, Journal de Physique (Paris) I 3 (1993) 277. Given a pair of classes, this algorithm computes the minimal distance between the convex hull of both classes, as illustrated in FIG. 5. Each single unit of the first layer represents a maximal margin (stability) Perceptron. A single such unit is shown in more detail in FIG. 5, which shows a schematic illustration of the Perceptron with maximal stability for two classes. All black points represent documents in one of the classes, the white points the documents in the second class. The algorithm delivers both the direction of the minimal connector and the two thresholds corresponding to the two lines defining the class borders.

Given a set of M documents and symbolic feature space of D-dimensions, the average running time of the learning algorithm scales as $O(Q^2 M)$, where Q=min(sparse(D), M). sparse (D) is the maximal sparse-representation dimension of all documents in D-dimensions. A uniform lower bound on the generalization error of Perceptrons with maximal stability is—given a zero learning error—inversely proportional to the square of the minimal connector length.

After all class pairs are separated with the above mentioned method, a second neural layer consisting of AND gates connects the first neuronal layer to an output layer coding the classes in a sparse representation. Other possible architectures are possible but do not influence the generalization ability, which is defined by the first neural layer.

Hence, the result of the learn process is embodied into a multilayer Perceptron network and stored into a data-bank managed by the View-manager together with self-test performance data (learning and generalization error computed with the leave-one-out estimator).

In the run-mode the system uses the stored data to provide for each new document a list of class candidates sorted according to their confidence. The confidence is a number ranging between 0 (no confidence) to 1 (high confidence) and represents the actual classifier's knowledge. Geometrically, the confidence is computed from the new document's position in the class-Voronoi-tessellation (see FIG. 3) by computing its distance as defined above from the actual classification borders of all classes. Given a whole set of unknown documents, the system ranges them in increasing confidence order and asks for corrections. These queries allow the system to acquire the largest amount of information per question and thus reduces the human intervention to the necessary minimum. Once sorted, the new documents can be incorporated into a new network by relearning.

The run module is used when processing new, unknown documents. Since the classifiers defined above are all two or three layers networks, they embody a genuinely parallel computational model and can be run extremely efficiently on multiprocessor machines and/or on especially designed hardware. This presents in itself a very efficient way of handling extremely large amount of data, especially for applications where the definition of classes is fixed (no adaptive learning is needed).

By allowing a fully automatic indexing procedure, starting from a small number of documents which have been learned, the system is able—once properly initialized—to perform an automatic (unsupervised) classification of unknown or unclassified documents. This classification is highly flexible, starting with differently labeled documents might lead to a different classification. Thereby clusters of data are generated the contents of which are inherently similar, while reflecting the initial classification with which the procedure was started.

Figure 6:
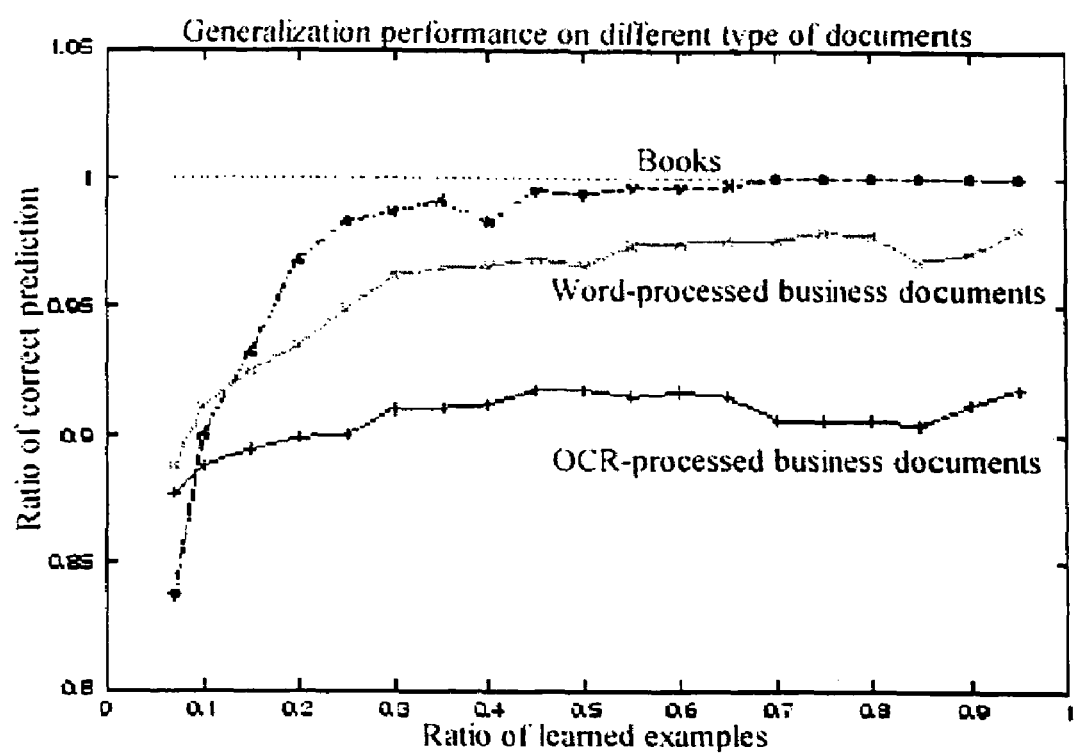
FIG. 6 shows a diagram representing the performance of an embodiment according to the present invention.

The system has been tested by performing several large scale experiments with typical business documents and correspondence which were stored either in WinWord, HTML, or in OCR-preprocessed form for both German and English languages. For electronically formated documents one typically obtains a generalization error of less than 5%. For raw OCR-preprocessed faxes and other documents (uncorrected text) the generalization error was typically below 10%. In FIG. 6 there are shown some typical learning curves. The documents used were obtained either via OCR, from Win-Word files or used directly in ASCII form. The x-coordinate shows the ratio of examples used for training the classifier over the total number of available examples. The documents were extracted at random from each class by using the same ratio. After training, the NOT learned documents were classified according to the first proposal of the classifier. The number of correctly classified documents over the total number of documents not used for training is shown on the y-coordinate. Including the classifier's second choice would further enhance the generalization performance.

One important feature of the described method is the very steep increase in generalization performance when only relatively few documents per class were learned. The business data comes from proprietary sources and is not in the public domain. However, these data may be regarded as typical for business data exchanges, containing short documents like invoices, assessments, travel-expense bills, reclamation letters, etc.

A very surprising result is the ability of this method to perfectly learn literary work. The data shown as "books" contained 16 works split in "documents" of 2-3 pages size. The list of the used books followed by the number of documents was the following: Aristotle: Metaphysics(75), E. Bronte: Wuthering Heights(83) G. Byron: Don Juan (147), C. Darwin: The descent of man (191) C. Dickens: Tale of two cities (137), Buddha: The Gospel (45) Epictetus: Discourses (71), B. Franklin: Paris 1776-1785 Homer: Odyssey (74), Ibsen: Peer Gynt (51) Melville: Moby Dick (151), F. Nietzsche: Thus spoke Zarathustra (79) J. J. Rousseau: The Confessions (171), Tolstoy: Anna Karenina (391) M. Twain: Tom Sawyer, and (49) Virgil: The Aeneid (101). Not only was the system able to predict with absolute accuracy the origin of the documents after about 70% of the books were learned but it also identified with a very high probability other works from the same author or very similar works of other authors.

In its actual implementation, using actual hardware as embodied by a 400 MHz Pentium II processor and 64 MB RAM the system can process (learn) a large amount of data (about 1 GB) in less than 10 min.

One application area of the invention described is the creation of a new type of databank based on learning personally defined views of the document set. After a relatively small number of documents were classified by expert personnel, the databank can make useful suggestions for classifications based on the content of the document. This approach leads ultimately to an automatic classification (indexing) and retrieval of documents which is much more powerful than that of relational databanks. In addition, by removing old documents from the learning process such a system can be made fully adaptive.

There has been described a method and an apparatus for a document database system based on classification. The apparatus consists of a preprocessor, a maximal margin multiperceptron supervised learning module, a multi views manager, and a standard relational database. It can perform a fast and accurate classification of documents based on many user-defined classification schemes called views. After the system's classification schemes and a relatively small number of examples of documents for each class have been defined either by default or by the user using the multi views manager, the preprocessor creates the space of documents and then associates each document to a highly dimensional but sparse document vector. The classifiers corresponding to different views are trained by a fast numerical algorithm, resulting into several maximal-margin Voronoi-tessellations of the document space. In each view, a new document is associated to an ordered list of normalized class confidences, calculated from the document's position in the Voronoi-tessellation. New documents can thus be automatically associated to one or several classes. If the choice of classes covers the database's indexing scheme, an automatic indexing of the document is obtained. Badly classifiable documents are stored in an exception class and resolved through a query-system. Documents can be searched in the database in three different ways: through normal indexing, by giving class labels of the document according to one or more classification schemes or by example, providing a document with similar content.

The multi views manager can be instructed to remove form the training set certain documents, like the oldest or the least used documents. This results in a fully adaptive classification scheme, where the class boundaries adapt over time to the actual distribution of documents.

The present invention has been described by describing embodiments taking the form of a method for classifying documents, a classification scheme representing the classification of already classified documents, and an apparatus for classifying unknown documents or an apparatus for representing a classification scheme representing already classified documents. The method for classifying unknown documents and the method for building a classification model or scheme may be implemented by a program running on a computer. Moreover, a classification scheme which has been generated by a method for building said classification scheme may be stored, for example, in a database, or in any memory of a computer or in a data carrier suitable for storing said classification scheme. The classification scheme such stored thereby also forms an embodiment of the invention, since it directly results from a method for building said classification scheme which is one of the aspects of the present invention, and since it structure reflects directly the method through which it has been generated.

Moreover, embodiments of the present invention may also consist in one of the following:

A computer program capable of running on a computer so that the system comprising the computer program plus the computer carries out a method according to any of the appended method claims.

A computer program loadable into a computer so that the computer programmed in this way is capable of or adapted to carrying out a method according to any of the appended method claims.

A computer program product loadable into a computer, comprising software code for performing the steps of the method according to any of the appended method claims when said product is running on a computer.

The invention claimed is:

1. A method for building a classification model for classifying unclassified documents based on the classification of a plurality of documents which respectively have been classified as belonging to one of a plurality of classes, said documents being digitally represented in a computer, said documents respectively comprising a plurality of terms which respectively comprise one or more symbols of a finite set of symbols, and said method comprising the following steps:

processing said plurality of documents according to a plurality of classification schemes; representing each of said plurality of documents in each of said classification schemes by a vector of n dimensions, said n dimensions forming a vector space, whereas the value of each dimension of said vector corresponds to the frequency of occurrence of a certain term in the document corresponding to said vector, so that said n dimensions span up a vector space;

representing the classification of said already classified documents into a plurality of classes corresponding to respective ones of said plurality of classification schemes by, for each of said classification schemes, creating a Voronoi-tessellation of said vector space separating said vector space into a plurality of subspaces by one or more hyperplanes, such that each subspace comprises one or more documents as represented by their corresponding vectors in said vector space, so that said each subspace corresponds to a class defined by a corresponding one of said plurality of classification schemes; and calculating a maximum margin surrounding said hyperplanes in said vector space such that said margin contains none of the vectors contained in the subspaces corresponding to said classification classes.

2. A method for the classification of a document digitally represented in a computer into one of a plurality of classes in each of a plurality of predefined classification schemes, said document respectively comprising a plurality of terms which respectively comprise one or more symbols of a finite set of symbols, said method comprising the steps of:

representing said document by a vector of n dimensions, said n dimensions spanning up a vector space, whereas the value of each dimension of said vector corresponds to the frequency of occurrence of a certain term in the document corresponding to said vector;

classifying said document into one of said plurality of classes in each of said classification schemes by determining, for each of said classification schemes, into which of a plurality of subspaces said vector falls, said subspaces being formed by creating a Voronoi-tessellation of said vector space separating said vector space spanned up by said n-dimensional vector through one or more hyperplanes to define said subspaces such that each subspace corresponds to one of said plurality of classes for each of said classification schemes; and calculating a location of said vector in at least one said subspaces by calculating a distance of said vector from said hyperplanes.

3. The method of claim 2 for automatically classifying an unknown document, said method further comprising: annotating a classification to said document or to its corresponding vector based on the result of said calculation of said location of said vector in said at least one subspace.

4. The method of claim 2, further comprising:

calculating a confidence level for the classification of a document based on the distance between the vector representing said document and said hyperplanes and further based on the maximum margin surrounding said hyperplanes.

5. The method of claim 4, further comprising one or both of the following:

listing the automatically classified documents according to their confidence value; and refining the classification scheme by selecting the document with the lowest confidence level or the document whose confidence level is below a certain threshold for repeatedly calculating the classification scheme based on the correct classification of the selected document.

6. A method of selecting, filtering, or retrieving one or more documents from a set of documents, said method comprising:

classifying said set of documents according to claim 2; and selecting, filtering or retrieving the documents which belong to a certain classification class or to certain classification classes.

7. The method of claim 2, said method being applied for performing one of the following:

filtering the output of a computer system, in particular the output of a query on a database, a file directory system or an internet search engine, such that only the output elements which are in accordance with one or more selected classes form the filtered output;

automatically assigning or routing a document to a directory or a routing path, by assigning or routing said document to the directory or the routing path which corresponds to one of a plurality of classes used to classify directories or routing paths;

ordering documents according to their relevance by using said classification scheme for classifying documents into classes which correspond to the relevance of the documents being contained in a certain class; analyzing, categorizing or archiving one or more unclassified documents, particularly a large set of unclassified documents such as the contents of a library, by classifying and/or ordering them according to said classification scheme; and checking the manually performed classification of one or more documents to identify inconsistencies or errors in said manual classification by comparing the result of an automatic classification according to one of the preceding claims with said manually performed classification.

8. The method of claim 1, wherein said finite set of symbols is one or more of the following: the ASCII-set of characters, a set of Chinese characters, and wherein a terms is one or more of the following: a word formed by a sequence of one or more of said symbols, a sequence of words respectively formed by a sequence of one or more of said symbols.

9. The method of claim 1, further comprising:
refining said classification model by a renewed calculation of said classification model by including further documents which have been classified as belonging to one of a said plurality of classes or by expanding said vector space by the incorporation of one or more additional dimensions corresponding to additional terms.

10. The method of claim 1, further comprising:
generating a plurality of sets of classification classes by generating a plurality of separations of said vector space into a corresponding set of subspaces such that each set of subspaces forms a classification model which corresponds to the classification of said documents.

11. The method of claim 1, wherein said classification model is used for indexing a database such that an index corresponds to a classification class or an intersection of classes in a plurality of classification schemes.

12. An apparatus for classifying a plurality of documents, which respectively have been classified as belonging to one of a plurality of classes, said documents being digitally represented in a computer, said documents respectively comprising a plurality of terms which respectively comprise one or more symbols of a finite set of symbols, said apparatus comprising a processor responsive to a program of stored instructions for:
processing said plurality of documents according to a plurality of classification schemes; representing each of said plurality of documents in each of said classification schemes by a vector of n dimensions, said n dimensions forming a vector space, whereas the value of each dimension of said vector corresponds to the frequency of occurrence of a certain term in the document corresponding to said vector, so that said n dimensions span up a vector space;
representing the classification of said already classified documents into classes by a plurality of classes corresponding to respective ones of said plurality of classification schemes by, for each of said classification schemes, creating a Voronoi-tessellation of said n-dimensional vector space separating said n-dimensional vector space into a plurality of subspaces by one or more hyperplanes, such that each subspace comprises one or more documents as represented by their corresponding vectors in said vector space, so that said each subspace corresponds to a class defined by a corresponding one of said plurality of classification schemes; and
calculating a maximum margin surrounding said hyperplanes in said vector space such that said margin contains none of the vectors contained in the subspaces corresponding to said classification classes.

13. An apparatus for classifying a document digitally represented in a computer into one of a plurality of classes in each of a plurality of predefined classification schemes, said document respectively comprising a plurality of terms which respectively comprise one or more symbols of a finite set of symbols, said document belonging to one of a plurality of classes, said apparatus comprising a processor responsive to a stored program of instructions for:
representing said document by a vector of n dimensions, said n dimensions spanning up a vector space, whereas the value of each dimension of said vector corresponds to the frequency of occurrence of a certain term in the document corresponding to said vector;
classifying said document into one of said plurality of classes in each of said classification schemes by determining, for each of said classification schemes, into which of a plurality of subspaces said vector falls, said subspaces being formed by creating a Voronoi-tessellation of said vector space separating said n-dimensional vector space spanned up by said n-dimensional vector through one or more hyperplanes to define said subspaces such that each subspace corresponds to one of said plurality of classes for each of said classification schemes; and
calculating a location of said vector in at least one said subspaces by calculating a distance of said vector from said hyperplanes.

14. A software tool embodied on a computer-readable medium for building a classification model for classifying unclassified documents based on the classification of a plurality of documents which respectively have been classified as belonging to one of a plurality of classes, said documents being digitally represented in a computer, said documents respectively comprising a plurality of terms which respectively comprise one or more symbols of a finite set of symbols, and said software tool comprising:
computer program code for processing said plurality of documents according to a plurality of classification schemes;
computer program code for representing each of said plurality of documents in each of said classification schemes by a vector of n dimensions, said n dimensions forming a vector space, whereas the value of each dimension of said vector corresponds to the frequency of occurrence of a certain term in the document corresponding to said vector, so that said n dimensions span up a vector space;
computer program code for representing the classification of said already classified documents into a plurality of classes corresponding to respective ones of said plurality of classification schemes by, for each of said classification schemes, creating a Voronoi-tessellation of said vector space separating said vector space into a plurality of subspaces by one or more hyperplanes, such that each subspace comprises one or more documents as represented by their corresponding vectors in said vector space, so that said each subspace corresponds to a class defined by a corresponding one of said plurality of classification schemes; and
computer program code for calculating a maximum margin surrounding said hyperplanes in said vector space such that said margin contains none of the vectors contained in the subspaces corresponding to said classification classes.

15. A software tool embodied on a computer-readable medium for the classification of a document digitally represented in a computer into one of a plurality of classes in each of a plurality of classification schemes, said document respectively comprising a plurality of terms which respectively comprise one or more symbols of a finite set of symbols, said method classifying said document as belonging to one of a plurality of classes, and said software tool comprising:
computer program code for representing said document by a vector of n dimensions, said n dimensions spanning up a vector space, whereas the value of each dimension of said vector corresponds to the frequency of occurrence of a certain term in the document corresponding to said vector;
computer program code for classifying said document into one of said plurality of classes in each of said classification schemes by determining into which of a plurality of subspaces said vector falls for each of said classification schemes, said subspaces being formed by creating a Voronoi-tessellation of said vector space separating said vector space spanned up by said n-dimensional vector through one or more hyperplanes to define said subspaces such that each subspace corresponds to one of said plurality of classes; and computer program code for calculating a location of said vector in at least one said subspaces by calculating a distance of said vector from said hyperplanes.

16. A computer readable medium having embodied thereon computer program code, said computer program code comprising:

a computer program code portion for processing a plurality of documents according to a plurality of classification schemes; a computer program code portion for representing each of said plurality of documents in each said classification schemes by a vector of n dimensions, said n dimensions forming a vector space, whereas the value of each dimension of said vector corresponds to the frequency of occurrence of a certain term in the document corresponding to said vector, so that said n dimensions span up a vector space; and a computer program code portion for representing the classification of said already classified documents into a plurality of classes corresponding to respective ones of said plurality of classification schemes by, for each of said classification schemes, creating a Voronoi-tessellation of said vector space separating said vector space into a plurality of subspaces by one or more hyperplanes, such that each subspace comprises one or more documents as represented by their corresponding vectors in said vector space, so that said each subspace corresponds to a class defined by a corresponding one of said plurality of classification schemes; and a computer program code portion for calculating a maximum margin surrounding said hyperplanes in said vector space such that said margin contains none of the vectors contained in the subspaces corresponding to said classification classes.

17. A computer readable medium having embodied thereon computer program code, said computer program code comprising:

a computer program code portion for representing a document by a vector of n dimensions, said n dimensions spanning up a vector space, whereas the value of each dimension of said vector corresponds to the frequency of occurrence of a certain term in the document corresponding to said vector; and a computer program code portion for classifying said document into one of said plurality of classes in each of a plurality of predefined classification schemes by determining into which of a plurality of subspaces said vector falls for each of said classification schemes, said subspaces being formed in each of said classification schemes by creating a Voronoi-tessellation of an n-dimensional vector space separating said vector space spanned up by said vector through one or more hyperplanes to define said subspaces such that each subspace corresponds to one of said plurality of classes in each of said classification schemes; and a computer program code portion for calculating a location of said vector in at least one said subspaces by calculating a distance of said vector from said hyperplanes.

18. A computer readable medium comprising computer program code for building a classification model for classifying unclassified documents based on the classification of a plurality of documents which respectively have been classified as belonging to one of a plurality of classes, said documents being digitally represented in a computer, said documents respectively comprising a plurality of terms which respectively comprise one or more symbols of a finite set of symbols, said computer program code comprising:

a computer program code portion for processing said plurality of documents according to a plurality of classification schemes; a computer program code portion for representing each of said plurality of documents in each said classification schemes by a vector of n dimensions, said n dimensions forming a vector space, whereas the value of each dimension of said vector corresponds to the frequency of occurrence of a certain term in the document corresponding to said vector, so that said n dimensions span up a vector space;

a computer program code portion for representing the classification of said already classified documents into a plurality of classes corresponding to respective ones of said plurality of classification schemes by, for each of said classification schemes, creating a Voronoi-tessellation of said vector space separating said vector space into a plurality of subspaces by one or more hyperplanes, such that each subspace comprises one or more documents as represented by their corresponding vectors in said vector space, so that said each subspace corresponds to a class defined by a corresponding one of said plurality of classification schemes; and a computer program code portion for calculating a maximum margin surrounding said hyperplanes in said vector space such that said margin contains none of the vectors contained in the subspaces corresponding to said classification classes.

19. A computer readable medium comprising computer program code for the classification of a document digitally represented in a computer into one of a plurality of classes in each of a predefined plurality of classification schemes, said document respectively comprising a plurality of terms which respectively comprise one or more symbols of a finite set of symbols, said method classifying said document as belonging to one of a plurality of classes, said computer program code comprising:

a computer program code portion for representing said document by a vector of n dimensions, said n dimensions spanning up a vector space, whereas the value of each dimension of said vector corresponds to the frequency of occurrence of a certain term in the document corresponding to said vector;

a computer program code portion for classifying said document into, for each of said classification schemes, one of said plurality of classes in a respective one of said classification schemes by determining into which of a plurality of subspaces said vector falls, said subspaces being formed by creating a Voronoi-tessellation of said vector space separating said vector space spanned up by said n-dimensional vector through one or more hyperplanes to define said subspaces such that each subspace corresponds to one of said plurality of classes for each of said classification schemes; and a computer program code portion for calculating a location of said vector in at least one said subspaces by calculating a distance of said vector from said hyperplanes.

20. A method of generating a classification model, the classification model being stored in a data structure on a computer-readable medium, said data structure representing a classification model for classifying unclassified documents based on the classification of a plurality of documents which respectively have been classified as belonging to one of a plurality of classes, said documents being digitally represented in a computer, said documents respectively comprising a plurality of terms which respectively comprise one or more symbols of a finite set of symbols, wherein said classification model is generated by the steps of:

processing said plurality of documents according to each of a plurality of classification schemes;

representing each of said plurality of documents in each of said classification schemes by a vector of n dimensions, said n dimensions forming a vector space, whereas the value of each dimension of said vector corresponds to the frequency of occurrence of a certain term in the document corresponding to said vector, so that said n dimensions span up a vector space;

representing the classification of said already classified documents into a plurality of classes corresponding to respective ones of said plurality of classification schemes by, for each of said classification schemes, creating a Voronoi-tessellation of said vector space separating said vector space into a plurality of subspaces by one or more hyperplanes, such that each subspace comprises one or more documents as represented by their corresponding vectors in said vector space, so that said each subspace corresponds to a class defined by a corresponding one of said plurality of classification schemes; and calculating a maximum margin surrounding said hyperplanes in said vector space such that said margin contains none of the vectors contained in the subspaces corresponding to said classification classes.

* * * * *